| (12) | United States Patent<br>Sarapata et al. | (10) Patent No.: US 12,416,344 B2<br>(45) Date of Patent: Sep. 16, 2025 |
|---|---|---|

(54) HYDRAULIC DAMPER WITH A HYDROMECHANICAL COMPRESSION STOP ASSEMBLY

(71) Applicant: BeijingWest Industries Co., Ltd., Beijing (CN)

(72) Inventors: Mateusz Szymon Sarapata, Wysoka (PL); Michal Jerzy Popielarz, Cracow (PL); Dominik Kasprzyk, Debica (PL)

(73) Assignee: BeijingWest Industries Co., Ltd., Beijing (CN)

( * ) Notice: Subject to any disclaimer, the term of this patent is extended or adjusted under 35 U.S.C. 154(b) by 439 days.

(21) Appl. No.: 17/942,117

(22) Filed: Sep. 10, 2022

(65) Prior Publication Data

US 2023/0111905 A1    Apr. 13, 2023

(30) Foreign Application Priority Data

Oct. 9, 2021    (CN) .......................... 202111176150.4

(51) Int. Cl.
| F16F 13/00 | (2006.01) |
| B60G 15/06 | (2006.01) |
| B60G 17/08 | (2006.01) |

(52) U.S. Cl.
CPC .......... *F16F 13/007* (2013.01); *B60G 15/061* (2013.01); *B60G 17/08* (2013.01);
(Continued)

(58) Field of Classification Search
CPC ............... F16F 13/0078; F16F 2222/12; F16F 2228/066; F16F 2230/007; F16F 2232/08;
(Continued)

(56) References Cited

U.S. PATENT DOCUMENTS 3,447,644 A * 6/1969 Duckett .................... F16F 9/48
188/315
4,782,925 A    11/1988 Grundei
(Continued)

FOREIGN PATENT DOCUMENTS

| CN | 105452707 A | 3/2016 |
| CN | 107701645 A | 2/2018 |

(Continued)

OTHER PUBLICATIONS

Extended European Search Report issued on Feb. 7, 2023 for counterpart European Patent Application No. 22200080.4.
(Continued)

*Primary Examiner* — Robert A. Siconolfi
*Assistant Examiner* — James K Hsiao
(74) *Attorney, Agent, or Firm* — William H. Honaker; Dickinson Wright PLLC (57) ABSTRACT

A hydraulic damper comprises a main tube, a piston assembly, a base valve assembly, and a compression stop assembly. The compression stop assembly includes an insert defining an inner chamber, and a sleeve displaceable along with the main piston assembly and configured to be slidably introduced inside the inner chamber. The sleeve has a diameter lower than the diameter of the main tube defining a first external flow channel between the sleeve and the main tube; the sleeve is attached to the piston assembly by a spring disposed within the sleeve; and the insert is provided with a plurality of axially-spaced holes and has an annular flange adjoining the inner wall of the main tube and separating the compression chamber from a second external flow channel between the radially external outlets of the holes and the base valve assembly.

18 Claims, 5 Drawing Sheets

(52) U.S. Cl.
CPC .. *B60G 2202/30* (2013.01); *B60G 2204/4502* (2013.01); *B60G 2206/41* (2013.01); *B60G 2500/11* (2013.01); *B60G 2800/162* (2013.01); *F16F 2222/12* (2013.01); *F16F 2228/066* (2013.01); *F16F 2230/007* (2013.01); *F16F 2232/08* (2013.01); *F16F 2234/02* (2013.01)

(58) Field of Classification Search
CPC .......... F16F 2234/02; F16F 9/49; F16F 9/585; F16F 9/3257; F16F 9/185; F16F 9/32; B60G 15/061; B60G 17/08; B60G 2202/30; B60G 2204/4502; B60G 2206/41; B60G 2500/11; B60G 2800/162; B60G 2204/45
See application file for complete search history.

(56) References Cited

U.S. PATENT DOCUMENTS

| | | | |
|---|---|---|---|
| 6,814,193 B2* | 11/2004 | Grundei | F16F 9/061 |
| | | | 188/322.22 |
| 9,091,320 B1* | 7/2015 | Smith | F16F 9/48 |
| 9,593,697 B2* | 3/2017 | Baalmann | F16F 9/49 |
| 9,909,638 B2* | 3/2018 | Chyla | F16F 13/007 |
| 9,982,738 B2* | 5/2018 | Lizarraga Senar | F16F 9/49 |
| 10,876,591 B2* | 12/2020 | Mallin | F16F 9/5126 |
| 11,181,161 B2* | 11/2021 | Baldoni | F16F 9/19 |
| 11,434,969 B2* | 9/2022 | Maton | F16F 9/0227 |
| 11,668,367 B2* | 6/2023 | Kasprzyk | F16F 9/185 |
| | | | 188/284 |
| 2001/0025753 A1 | 10/2001 | Pfundstein et al. | |
| 2004/0060787 A1 | 4/2004 | Nakamura et al. | |
| 2015/0090548 A1* | 4/2015 | Yamanaka | F16F 9/3271 |
| | | | 29/434 |
| 2016/0223045 A1* | 8/2016 | Baldoni | F16F 9/48 |
| 2018/0119770 A1* | 5/2018 | Bruno | F16F 9/516 |
| 2018/0223942 A1* | 8/2018 | Kus | F16F 9/165 |
| 2018/0355944 A1 | 12/2018 | Veltum et al. | |
| 2021/0088096 A1 | 3/2021 | Baldoni et al. | |
| 2021/0123495 A1* | 4/2021 | Sankaran | F16F 9/185 |
| 2022/0333664 A1* | 10/2022 | Kasprzyk | F16F 9/49 |

FOREIGN PATENT DOCUMENTS

| | | |
|---|---|---|
| CN | 108087481 A | 5/2018 |
| CN | 207961387 U | 10/2018 |
| CN | 208935250 U | 6/2019 |
| CN | 113074207 A | 7/2021 |
| DE | 1176498 B | 8/1964 |
| DE | 1430494 B1 | 4/1970 |
| DE | 2659137 A1 | 6/1978 |
| DE | 102015119731 A1 | 5/2017 |
| DE | 10201906510 A1 | 11/2020 |
| EP | 1717478 A1 | 11/2006 |
| EP | 2374638 A2 | 10/2011 |
| FR | 3001017 A1 | 7/2014 |
| JP | 2008064275 A | 3/2008 |
| WO | 2006005330 A1 | 1/2006 |
| WO | 2008025586 A1 | 3/2008 |
| WO | 2020231972 A1 | 11/2020 |

OTHER PUBLICATIONS

The First Office Action and Search Report issued on Oct. 31, 2022 for counterpart Chinese patent application No. 202111176150.4, along with machine EN translation downloaded from EPO.

* cited by examiner

HYDRAULIC DAMPER WITH A HYDROMECHANICAL COMPRESSION STOP ASSEMBLY

CROSS-REFERENCE TO RELATED APPLICATIONS

This application claims priority to Chinese Patent Application No. 202111176150.4, filed on Oct. 9, 2021, which is hereby incorporated by reference in its entirety.

FIELD OF THE INVENTION

The present disclosure relates to a hydraulic damper, in particular a motor vehicle suspension damper.

BACKGROUND OF THE INVENTION

Document US2001025753 discloses a damper assembly comprising a cylinder in which a piston rod is mounted in an axially adjustable fashion. At that end of the piston rod which is arranged in the cylinder, a piston is provided which separates a compression chamber from a rebound chamber. A rebound stop assembly which includes a rebound spring is disposed in the rebound chamber. At the end distal to the piston, the rebound spring includes an auxiliary piston, the external diameter of which is smaller than an internal diameter of the cylinder. In an end section of the rebound chamber, an auxiliary cylinder is formed in the interior of the cylinder, the internal diameter of the auxiliary cylinder matches the external diameter of the auxiliary piston so that the auxiliary piston interacts with the cylinder wall of the auxiliary cylinder in a radially sealing fashion. Given a sufficiently large rebound stroke, the auxiliary piston moves into the auxiliary cylinder and thus closes off the interior of the auxiliary cylinder on the side facing the piston.

Documents US2018355944, DE102015119731 and DE1430494 dis-close damper assemblies provided with various end of stroke stop assemblies comprising compressible spring arrangements coupled with pistons.

As a compression stop assembly requires space for operation, it is common to provide this space by decreasing a so-called minimum bearing span of a damper, that is the distance between a rebound stop and a main piston assembly. This in turn restricts implementation of the damper in suspension systems with a piston rod that is subjected to side loads (e.g. MacPherson struts), where a sufficient bearing span is crucial for proper operation of the damper. It is thus desirable to reduce the working length of a compression stop assembly. Reduced working length of a compression stop assembly is also beneficial in terms of packaging and handling the dampers.

It has been the object of the present disclosure to provide a hydraulic damper with a compression stop assembly, which would feature reduced operational length, would be cost efficient and simple in manufacture and assembly, and which would provide versatile tuning properties for shaping the additional damping force.

SUMMARY OF THE INVENTION

The present invention provides a hydraulic damper assembly. The hydraulic damper comprises a main tube filed with working liquid and extending between an open end and a closed end. The hydraulic damper also comprises a piston assembly slidably disposed inside the main tube. The piston assembly is attached to a piston rod that extends outside the hydraulic damper through a sealed piston rod guide located at the open end, dividing the main tube into a rebound chamber and a compression chamber and configured to generate a damping force. The hydraulic damper also comprises a base valve assembly located at the closed end of the compression chamber and configured to control a flow of the working liquid between the compression chamber and an compensation chamber. The hydraulic damper also comprises a compression stop assembly located in the compression chamber. The compression stop assembly includes an insert defining an inner chamber. The compression stop assembly also includes a sleeve that is displaceable along with the piston assembly and configured to be slidably introduced inside the inner chamber of the insert at an end of a compression stroke of the hydraulic damper to generate an additional damping force. The sleeve has an external diameter that is smaller than an internal diameter of the main tube, defining a first external flow channel between the sleeve and the main tube. The insert defines a second external flow channel extending annularly thereabout between the sleeve and the main tube. The insert defines a plurality of axially-spaced holes each providing fluid communication between the inner chamber and the base valve assembly via the second external flow channel.

In some embodiments, the piston assembly includes compression and rebound valve assemblies to control the flow of working liquid passing between the rebound chamber and the compression chamber to generate the damping force.

In some embodiments, the sleeve is attached to the piston assembly by a spring disposed within the sleeve.

In some embodiments, the spring is a coil spring.

In other embodiments, a wave spring, for example, might be employed.

In some embodiments, the insert has an annular flange adjoining an inner wall of the main tube and separating the compression chamber from the second external flow channel.

In some embodiments, the sleeve has a hollow interior that defines a radially internal flow channel.

In some embodiments, the sleeve comprises a plurality of radial projections making a sliding fit with the main tube and separated by bridges.

In some embodiments, the base valve assembly includes a compression valve assembly and a rebound valve assembly each configured to control the flow of the working liquid between the compression chamber and the compensation chamber.

In some embodiments, the compression stop assembly further comprises a compression safety valve that opens at a predefined threshold of pressure in the inner chamber of said insert and allows for a flow of working liquid from said inner chamber of said insert to the compression valve assembly of the base valve assembly that bypasses said second external flow channel.

In some embodiments, the compression stop assembly further comprises a rebound check valve that allows a flow of the working liquid from the rebound valve assembly of the base valve assembly to said inner chamber of said insert, bypassing said second external flow channel during a rebound stroke, and blocking the flow of the working liquid therethrough during the compression stroke.

In some embodiments, the compression stop assembly further comprises: a compression safety valve that opens at a predefined threshold of pressure in the inner chamber of said insert and allows for a flow of working liquid from said inner chamber of said insert to the compression valve assembly of the base valve assembly that bypasses said second external flow channel; a rebound check valve that allows a flow of the working liquid from the rebound valve assembly of the base valve assembly to said inner chamber of said insert, bypassing said second external flow channel during a rebound stroke, and blocking the flow of the working liquid therethrough during the compression stroke; and a fixing member fixed to the base valve assembly and to said insert and comprising a plurality of angularly disposed dual stroke flow passages joining the base valve assembly with said second external flow channel, wherein at least one of said compression safety valve and said rebound check valve comprises a plurality of deflective discs covering a plurality of angularly disposed flow passages in said fixing member.

In some embodiments, the insert includes an internal surface defining a plurality of axial projections, and the plurality of axially-spaced holes each include a radially-internal outlet located in a corresponding one of the axial projections.

In some embodiments, the insert adjoins an inner wall of the main tube and the second external flow channel is defined by a plurality of grooves made in a radially external surface of the insert and in fluid connection with the axially-spaced holes.

In some embodiments, the main tube is provided with a widened section to receive the insert.

In some embodiments, the insert and/or the sleeve is/are made of plastic, such as polyamide.

In some embodiments, an insert is made as a single element with a fixing member and provided with a compression safety valve and/or a rebound check valve.

BRIEF DESCRIPTION OF THE DRAWINGS

The invention shall be described and explained below in connection with the attached drawings on which.

DETAILED DESCRIPTION

Figure 1:
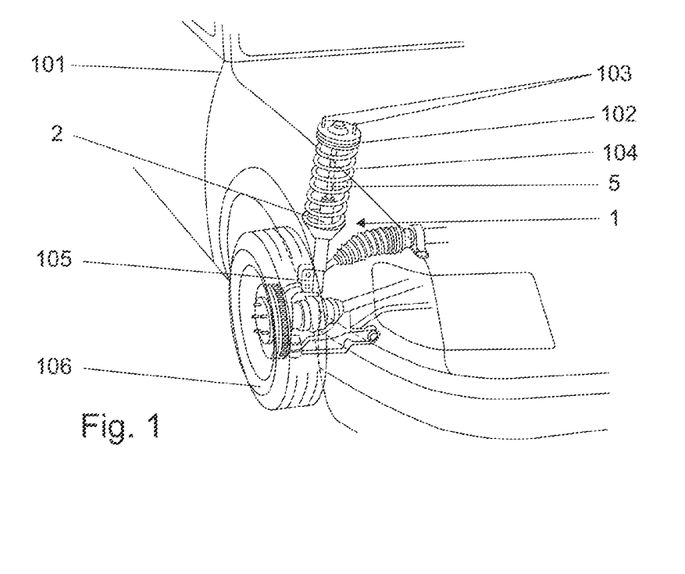
FIG. 1 illustrates a fragment of a vehicle suspension comprising the damper according to the present disclosure.

FIG. 1 schematically illustrates a fragment of an exemplary vehicle suspension comprising a hydraulic damper 1 of the present disclosure attached to a vehicle chassis 101 by a top mount 102 and a plurality of screws 103 disposed on the periphery of the upper surface of the top mount 102. The top mount 102 is connected to a coil spring 104 and a piston rod 5 of the hydraulic damper 1. The hydraulic damper 1 includes an external tube 2 connected to the steering knuckle 105 supporting the vehicle wheel 106.

FIGS. 2-6 present an embodiment of the hydraulic damper 1 configured as a twin-tube damper, according to the present disclosure. The hydraulic damper 1 comprises an external tube 2 and a main tube 3 disposed within the external tube 2 and extending between an open end and a closed end. The main tube 3 is filled with viscous working liquid inside of which a piston assembly 4 is disposed. The piston assembly 4 is attached to a piston rod 5 that extends outside the hydraulic damper 1 through a sealed piston rod guide 6 located at the open end. The hydraulic damper 1 is also provided with a base valve assembly 7 fixed at the closed end of the main tube 3.

Figure 3:
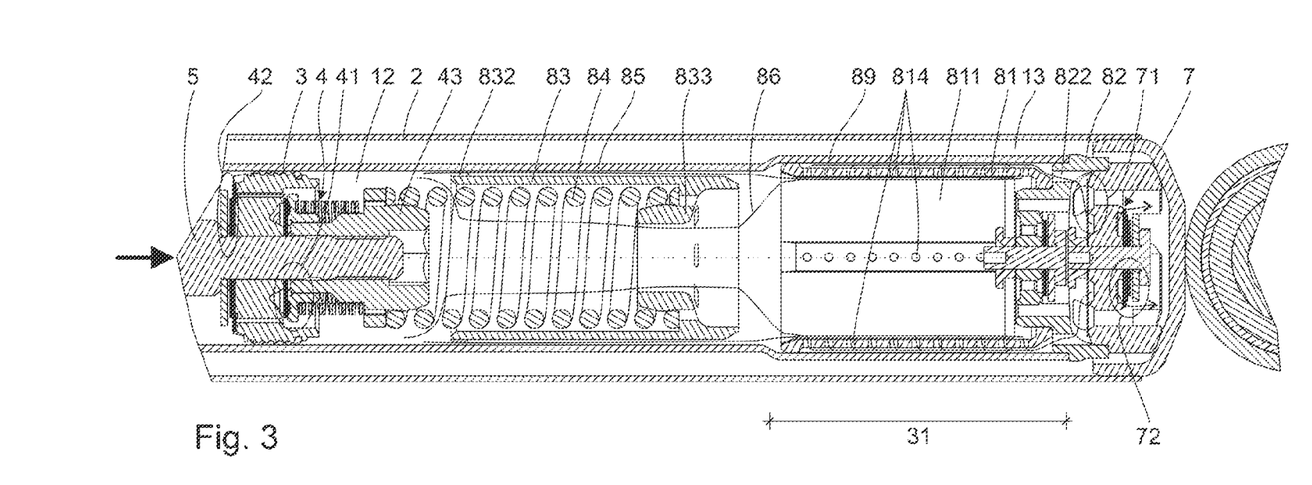
FIG. 3 is a schematic cross-sectional view of the embodiment of the compression stop assembly shown in FIG. 2 in an inactive state during the compression stroke.

The piston assembly 4 makes a sliding fit with the inner surface of the main tube 3 and divides the main tube 3 into a rebound chamber 11 (between the piston assembly 4 and the piston rod guide 6) and a compression chamber 12 (between the piston assembly 4 and the base valve assembly 7). The base valve assembly 7 is configured to control a flow of the working liquid between the compression chamber 12 and an compensation chamber 13. In some embodiments, and as shown in FIG. 3, the compensation chamber 13 extends annularly between the main tube 3 and the external tube 2.

A metal retaining member 51 is clenched on a piston rod 5 and supports a rebound stop 52 of elastomeric material. The distance between the rebound stop 52 and the piston assembly 4 defines a minimum bearing span 32 of the hydraulic damper 1.

The term "compression" as used herein with reference to particular elements of the damper refers to these elements or parts of elements that are adjacent to or face the compression chamber 12 or, in a case of working liquid flow direction, it refers to this flow direction that takes place during the compression stroke of the damper. Similarly, the term "rebound" as used in this specification with reference to particular elements of the damper refers to these elements or these parts of particular elements that are adjacent to or face the rebound chamber 11 or, in a case of working liquid flow direction, it refers to this flow direction that takes place during the rebound stroke of the damper.

The piston assembly 4 includes a first rebound valve assembly 41 and a first compression valve assembly 42. Each of the first compression and first rebound valve assemblies 41, 42 are configured to control the flow of working liquid passing between the rebound chamber 11 and the compression chamber 12 while the piston assembly 4 is in motion along an axis A and to generate a damping force opposing force applied to the piston rod 5 in corresponding compression and rebound directions. Also, the base valve assembly 7 includes a second rebound valve assembly 71 and a second compression valve assembly 72 to control the flow of working liquid passing between the compensation chamber 13 and the compression chamber 12, respectively, during rebound and compression stroke of the hydraulic damper 1. As it is well known to those skilled in the art, the valve assemblies 41, 42 and 71, 72 provide design parameters that may be used to shape desired characteristics of the hydraulic damper 1.

The hydraulic damper 1 is further provided with a compression stop assembly 8 located in the compression chamber 12 to generate an additional damping force at the end of the compression stroke e.g. in order to avoid abrupt stop of the piston assembly 4. Main components of the compression stop assembly 8 include an insert 81, which may have a generally cylindrical shape, and a sleeve 83 displaceable along with the piston assembly 4 and connected to the piston assembly 4 by a coil spring 84. Other types of springs, such as a wave spring, may be used in place of the coil spring 84.

Figure 9:
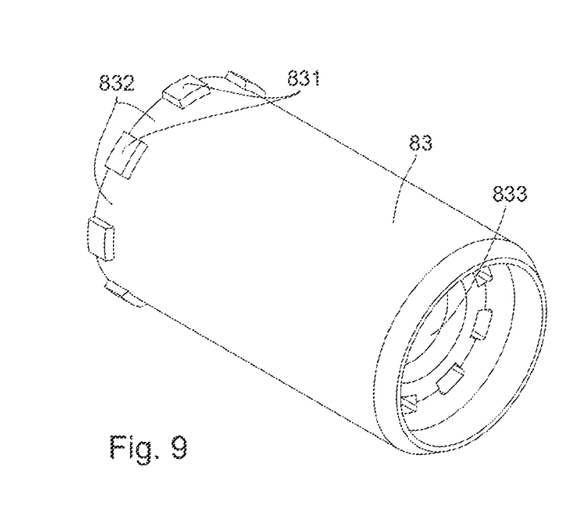
FIG. 9 shows a sleeve of the compression stop assembly shown in FIG. 2 in an axonometric view.
Figure 10:
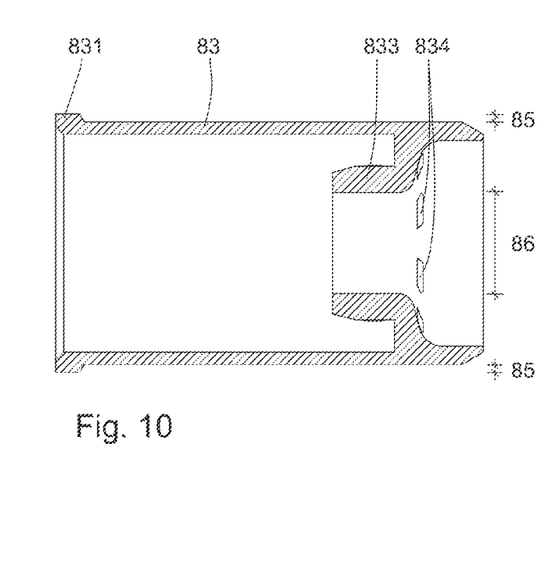
FIG. 10 shows a sleeve of the compression stop assembly shown in FIG. 2 in a cross-sectional view.

The sleeve 83, shown in detail in FIGS. 9 and 10, is made of polyamide and defines a radially external surface having an external diameter that is smaller than an internal diameter of the main tube 3, defining a first external flow channel 85 between the sleeve 83 and the main tube 3. The external diameter of the sleeve 83 may correspond to an internal diameter of the radially internal surface of the insert 81. The sleeve 83 is slidably disposed within the main tube 3 by a plurality of radial projections 831 disposed at regular angular intervals and making a sliding fit with the main tube 3 and separated by bridges 832 that allow a flow of working liquid between the radially external surface of the sleeve 83 and the main tube 3 through the first external flow channel 85 between the compression chamber 12 and the compensation chamber 13. Another, radially internal flow channel 86 between the compression chamber 12 and the compensation chamber 13 is provided inside the sleeve 83 between the coils of the coil spring 84 and through the tubular projection 833. Technological holes 834 facilitate injection molding of the tubular projection 833.

Figure 11:
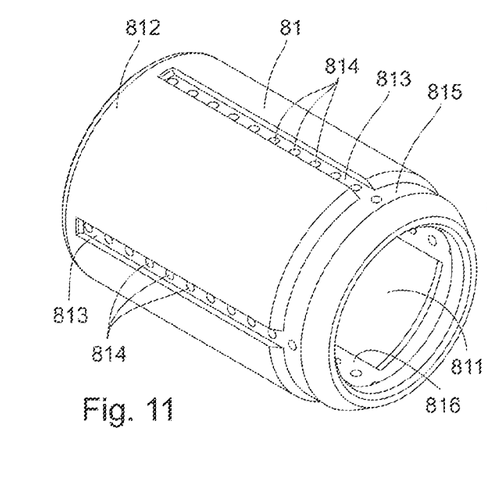
FIG. 11 shows an insert of the compression stop assembly shown in FIG. 2 in an axonometric view.
Figure 12:
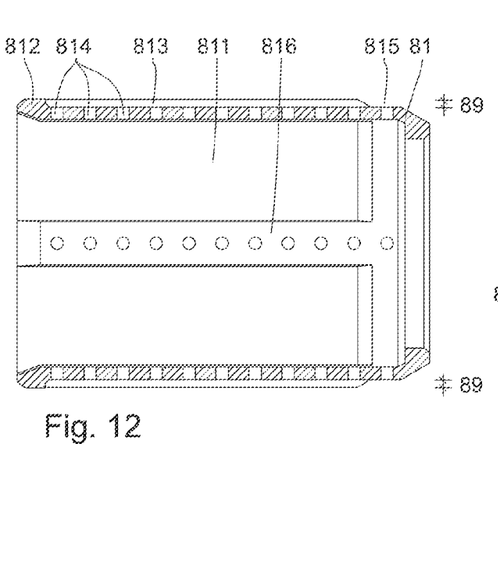
FIG. 12 shows an insert of the compression stop assembly shown in FIG. 2 in a cross-sectional view.

The insert 81, shown in detail in FIGS. 11 and 12, is in this embodiment made of polyamide and fixed to the base valve assembly 7 by a fixing member 82 press-fitted to the base valve assembly 7 and to the main tube 3. The insert 81 is also press-fitted to the fixing member 82 and in this embodiment is disposed within a widened section 31 of the main tube 3. The insert 81 has a radially internal surface that, along with the fixing member 82, defines an inner chamber 811 of the compression stop assembly 8. A second external flow channel 89 extends annularly about the insert 81, between the insert 81 and an interior surface of the main tube 3.

The insert 81 defines a plurality of axially-spaced holes 814 each providing fluid communication between the inner chamber 811 and the base valve assembly 7 via the second external flow channel 89. In some embodiments, the axially-spaced holes 814 may be arranged in four sets at regular angular spacing (i.e. spaced apart by 90-degrees between sets). In some embodiments, each set of the axially-spaced holes 814 may include eleven of the axially-spaced holes 814. However, the insert 81 may include a different number of sets, and each set may include a different number of the axially-spaced holes 814.

In some embodiments, the insert 81 adjoins the inner wall of the widened section 31 of the main tube 3 and in order to allow flow of liquid between the insert 81 and the main tube 3 through the base valve assembly 7. Radially internal outlets of the axially-spaced holes 814 are located in four axial projections 816 made in a radially internal surface of the insert 81. Radially external outlets of the axially-spaced holes 814 of each set are located in four axial grooves 813 made in a radially external surface of the insert 81. The axial grooves 813 are terminated at the rebound axial end of the insert 81 with an annular flange 812. At the compression axial end of the insert 81 the axial grooves 813 are joined with an annular channel 815 between the insert 81 and the main tube 3. The annular flange 812 may separate the second external flow channel 89 from the compression chamber 12.

The insert 81 may allow for a substantially unrestricted flow of working liquid between the compression chamber 12 and the compensation chamber 13 through the axially-spaced holes 814, the axial grooves 813, annular channel 815, eight radially external, equiangularly spaced dual stroke flow passages 822 made in the fixing member 82 and the second rebound valve assembly 71 or the second compression valve assembly 72 of the base valve assembly 7. In this embodiment, the second external flow channel 89 is defined also by the axial grooves 813 of the insert 81 and the dual stroke flow passages 822 of the fixing member 82.

Figure 13:
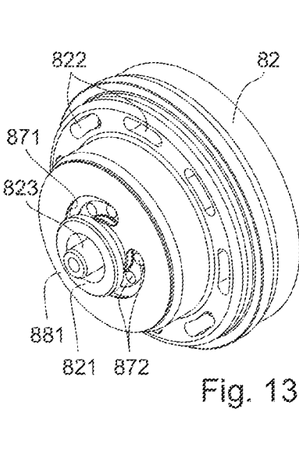
FIG. 13 shows a fixing member of the compression stop assembly shown in FIG. 2 in an axonometric view from an insert side.
Figure 14:
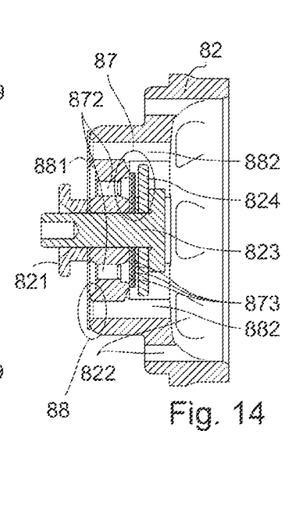
FIG. 14 shows a fixing member of the compression stop assembly shown in FIG. 2 in a cross-sectional view.

The fixing member 82, shown in detail in FIGS. 13 and 14, is made of sintered steel and comprises a compression safety valve 87 and a rebound check valve 88. The compression safety valve 87 comprises six deflective discs 873 covering a plurality of radially proximal flow passages 872 disposed at regular angular intervals and at a side of the fixing member 82 facing the base valve assembly 7. The rebound check valve 88 comprises a deflective disc 881 covering a plurality of radially distal flow passages 882, which are disposed at regular angular intervals. Deflective discs 873 and 881 are held in place by a bolt 823 passing through a retainer 824, deflective discs 873 of the compression safety valve 87, the fixing member 82, the deflective disc 881 of the rebound check valve 88 and riveted over a lock washer 821. To allow a flow of working liquid through radially proximal, radially proximal flow passages 872, the deflective disc 881 of the rebound check valve 88 is provided with two kidney-shaped openings 871 substantially at the radius of the radially proximal flow passages 872. In other embodiments of the inventions the deflective discs 873, 881 could be axially floating and biased by at least one spring.

The coil spring 84 has an end proximal to the piston assembly 4 press fitted on a shoulder nut 43 of the piston assembly 4 and an end distal to the piston assembly 4 press fitted on a tubular projection 833 defined at the compression end of the sleeve 83.

The hydraulic compression stop assembly 8 includes the sleeve 83 being displaceable along with the piston assembly 4 configured to be slidably introduced inside the inner chamber 811 of the insert 81 at an end of a compression stroke of the hydraulic damper 1 to generate an additional damping force. The functionality of the hydraulic compression stop assembly 8 is illustrated in FIGS. 3-8.

As shown in FIG. 3 in an inactive state of the hydraulic compression stop assembly 8 during the compression stroke of the hydraulic damper 1 working liquid may flow freely from the compression chamber 12 to the compensation chamber 13, as illustrated by arrows, both through the first external flow channel 85, the internal flow channel 86 and through the second external flow channel 89. During the compression stroke, the deflective disc 881 of the rebound check valve 88 closes radially distal flow passages 882.

Figure 4:
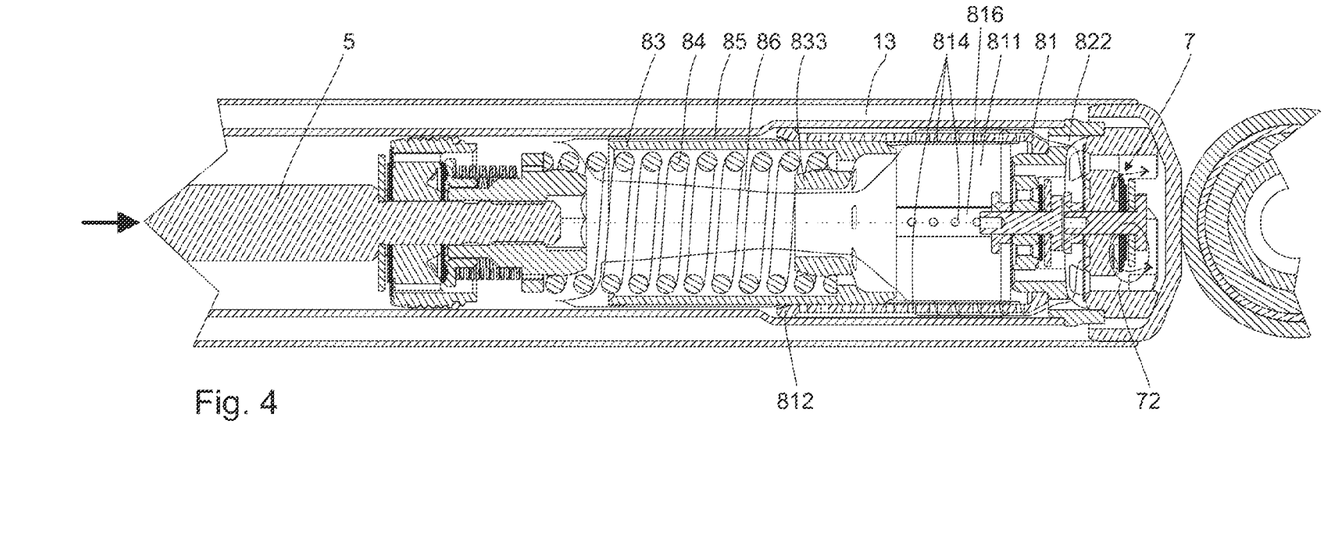
FIG. 4 is a schematic cross-sectional view of the embodiment of the compression stop assembly shown in FIG. 2 after activation.

As shown in FIG. 4, at certain position of the stroke the sleeve 83 enters the insert 81 and its radially external surface begins closing the axially-spaced holes 814 in the insert 81, which increases flow restrictions, and thereby increases damping. In this embodiment, the first external flow channel 85 remains open, as the flow of liquid is possible through the annular gaps between the axial projections 816.

Figure 5:
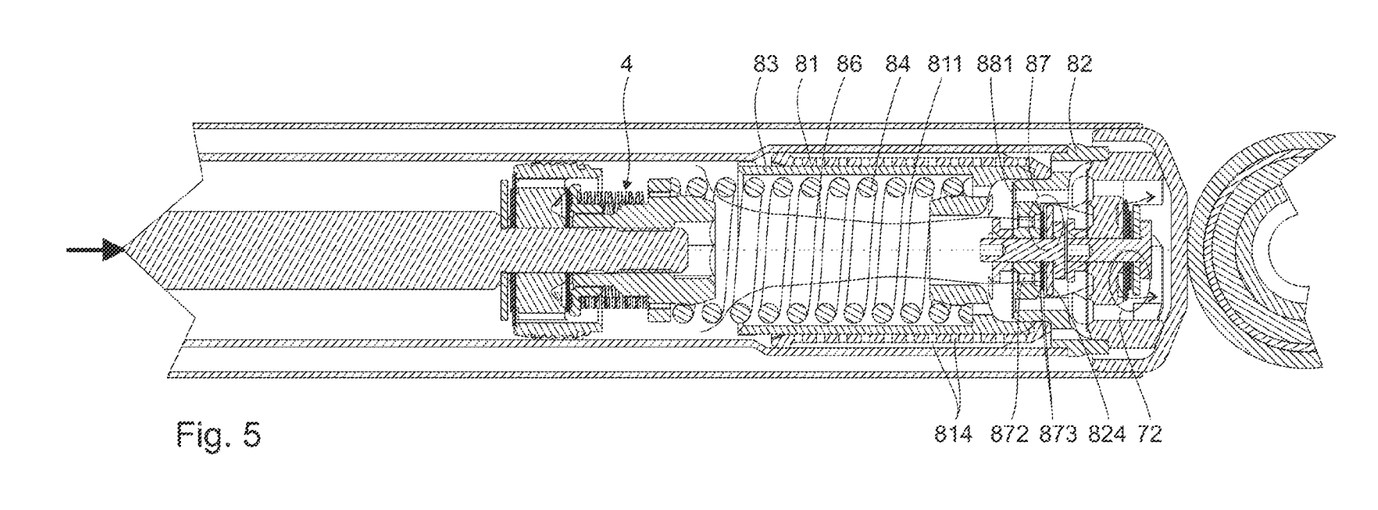
FIG. 5 is a schematic cross-sectional view of the embodiment of the compression stop assembly shown in FIG. 2 after activation, and with a safety valve engaged.

As shown in FIG. 5, at certain further position of the stroke all the axially-spaced holes 814 in the insert 81 are closed by the radially external surface of the sleeve 83 and the first external flow channel 85 is closed. In this position pressure of working liquid in the inner chamber 811 acting on the deflective discs 873 of the compression safety valve 87 in the fixing member 82 reaches a predefined threshold and forces the deflective discs 873 to deflect allowing a flow of working liquid to the second compression valve assembly 72 through the kidney-shaped openings 871 and the radially proximal flow passages 872.

Figure 2:
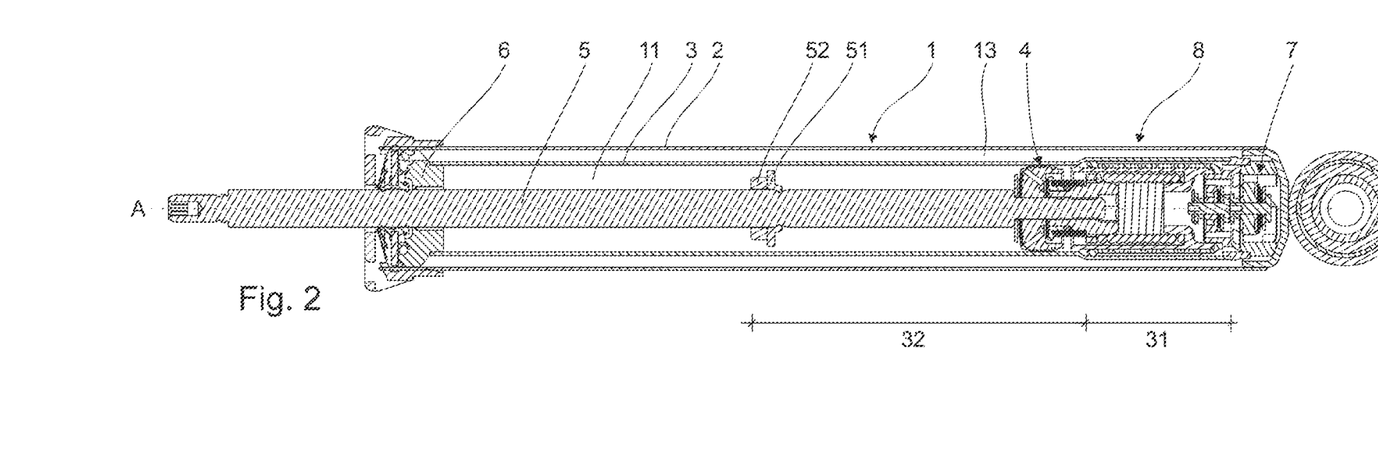
FIG. 2 is a schematic cross-sectional view of an embodiment of a twin-tube damper according to the present disclosure with an embodiment of the compression stop assembly in a fully compressed state.
Figure 6:
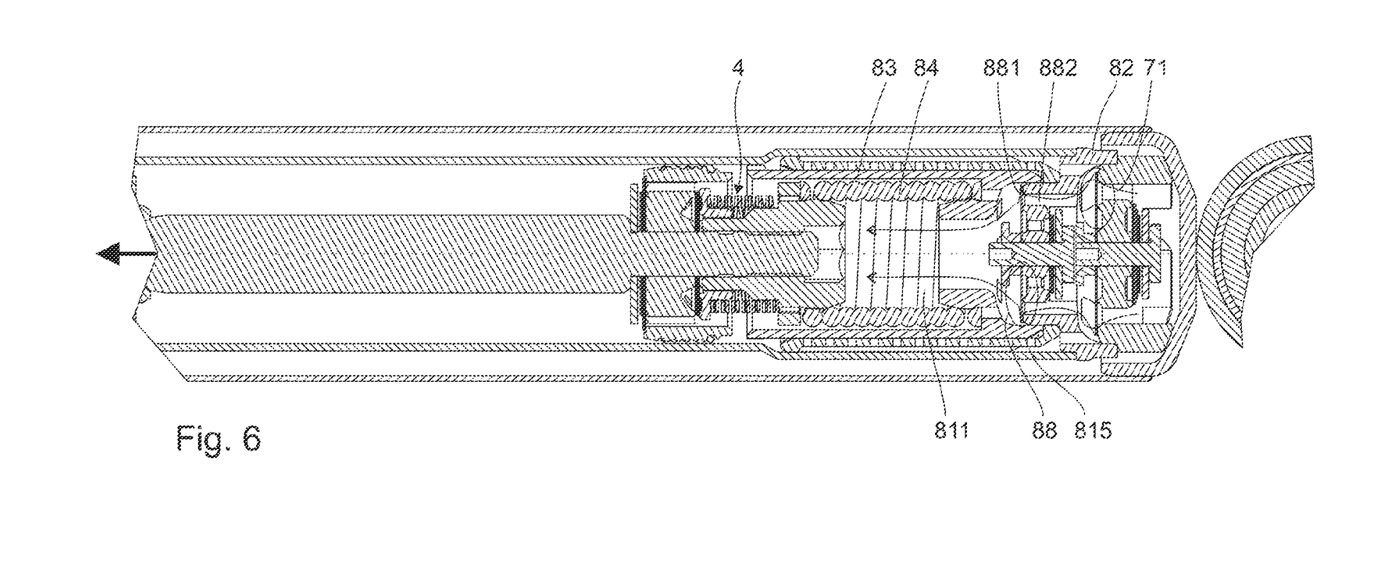
FIG. 6 is a schematic cross-sectional view of the embodiment of the compression stop assembly shown in FIG. 2 in a fully compressed state and at the onset of the rebound stroke.

Further progression of the main piston assembly 4 towards the compression chamber 12 triggers mechanical action of the compression stop assembly 8. Higher restrictions are generated by the compressing coil spring 84 and by progressively diminishing flow gaps between the coils of the coil spring 84 until finally, as shown in FIG. 6, the internal flow channel 86 is entirely closed and the coil spring 84 is fully compressed. This substantially shortens the working length of the compression stop assembly and enables a minimum bearing span 32 having excellent properties during the rebound stroke, as illustrated in FIG. 2. Furthermore, the length and stiffness of the coil spring 84 are additional tuning parameters of the compression stop assembly 8. The engagement point of the compression stop assembly 8 can be tuned by the length of the coil spring 84. Relation of the hydraulic and mechanic action of the compression stop assembly 8 can be tuned by the stiffness of the coil spring 84. The application of the coil spring 84 may reduce the space occupied by the compression stop assembly 8, when compared with conventional designs.

As also shown in FIG. 6, at the beginning of the rebound stroke in a fully compressed position of the compression stop assembly 8 the second external flow channel 89 is closed and in this position the flow of working liquid is possible only through radially distal flow passages 882 and the gap between the fixing member 82 and the deflective disc 881 of the rebound check valve 88. This prevents cavitation.

Figure 7:
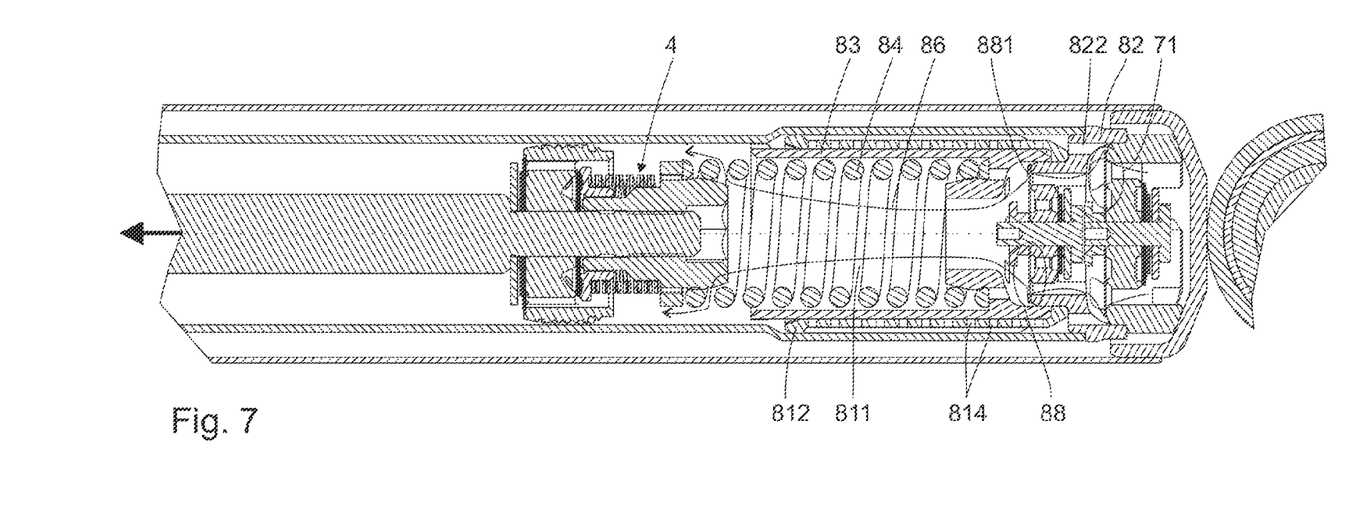
FIG. 7 is a schematic cross-sectional view of the embodiment of the compression stop assembly shown in FIG. 2 at an initial stage of the rebound stroke.

As shown in FIG. 7, as the piston assembly 4 moves into the rebound chamber 11 pressure of working liquid in the inner chamber 811 forces the coil spring 84 to extend which opens the radially internal flow channel 86. Second external flow channel 89 remains closed. In this position the flow is possible only through the rebound check valve 88.

Figure 8:
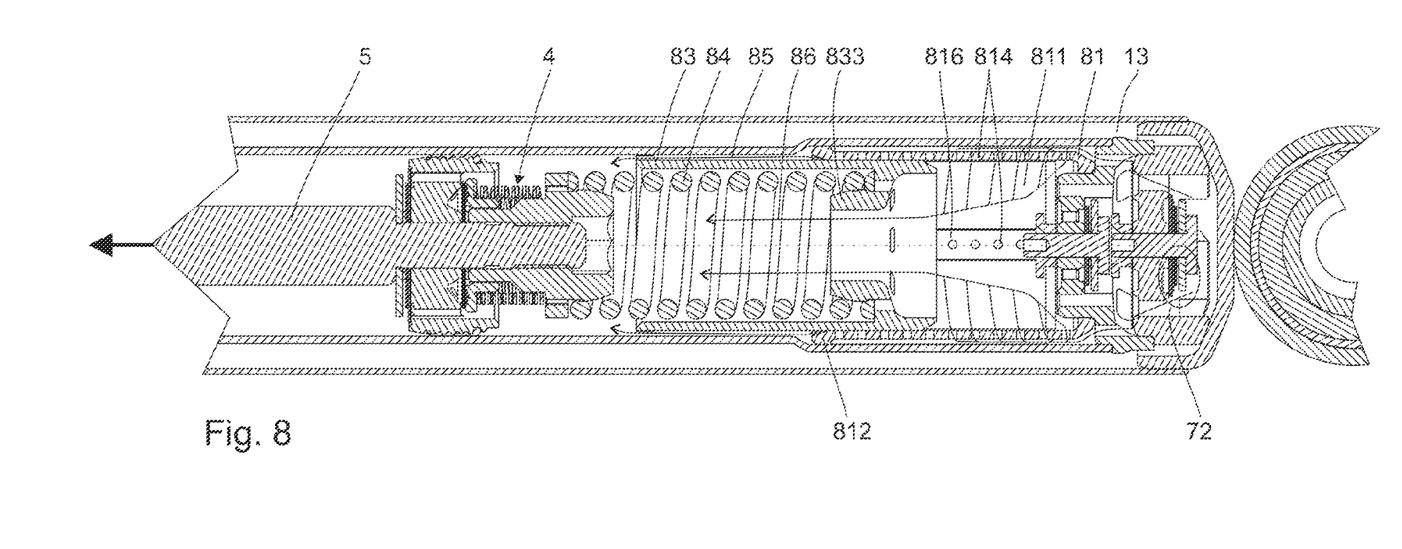
FIG. 8 is a schematic cross-sectional view of the embodiment of the compression stop assembly shown in FIG. 2 at a further stage of the rebound stroke.

As the piston assembly 4 advances even further into the rebound chamber 11, as shown in FIG. 8, and the fluid flows from the compensation chamber 13 and from the rebound chamber 11 to the compression chamber 12, through the second external flow channel 89, the internal flow channel 86, and the first external flow channel 85. In this embodiment, the rebound check valve 88 closes when pressure drops below a certain threshold. In other embodiments of the invention the rebound check valve 88 may be configured to remain open during the whole rebound stroke.

Tuning parameters of the compression stop assembly 8 may include number, thickness, diameter and preload of deflective discs 873 of the compression safety valve 87; number, shape, size, and/or distribution of the axially-spaced holes 814, the axial grooves 813, and the axial projections 816; length of the insert 81 and the sleeve 83; and finally stiffness and length of the coil spring 84. Relevant tuning parameters may vary along with the progression of the stroke after the compression stop assembly 8 is activated.

In other embodiments of the invention, not illustrated in detail in the drawing, insert can be made as a single element with the fixing member and provided with the compression safety valve 87 and/or the rebound check valve 88. In yet other embodiments of the invention, some of the axially-spaced holes 814 may remain open even at the final stage of the compression stroke, so that the application of the compression safety valve 87 and/or the rebound check valve 88 will not be necessary.

The above described embodiments of the present disclosure are merely exemplary. The figures are not necessarily to scale, and some features may be exaggerated or minimized. These and other factors however should not be considered as limiting the spirit of the invention, the intended scope of protection of which is indicated in appended claims.

LIST OF REFERENCE NUMERALS 1. damper
11. rebound chamber
12. compression chamber
13. compensation chamber
2. external tube
3. main tube
31. widened section
32. minimum bearing span
4. piston assembly
41. first rebound valve assembly
42. first compression valve assembly
43. shoulder nut
5. piston rod
51. retaining member
52. rebound stop
6. piston rod guide
7. base valve assembly
71. second rebound valve assembly
72. second compression valve assembly
8. compression stop assembly
81. insert
811. inner chamber
812. annular flange
813. axial groove
814. radial hole
815. annular channel
816. axial projection
82. fixing member
821. lock washer
822. dual stroke flow passage
823. bolt
824. retainer
83. sleeve
831. radial projection
832. bridge
833. tubular projection
834. technological hole
84. spring
85. first external flow channel
86. radially internal flow channel
87. safety valve
871. kidney-shaped opening
872. radially proximal flow passage
873. deflective disc
88. rebound check valve
881. deflective disc
882. radially distal flow passage
89. second external flow channel
101. vehicle chassis 102. top mount
103. screw
104. spring
105. steering knuckle
106. vehicle wheel

What is claimed is:

1. A hydraulic damper, comprising:
a main tube filed with working liquid and extending between an open end and a closed end;
a piston assembly slidably disposed inside the main tube, attached to a piston rod that extends outside the hydraulic damper through a sealed piston rod guide located at the open end, dividing the main tube into a rebound chamber and a compression chamber and configured to generate a damping force;
a base valve assembly located at the closed end of the compression chamber and configured to control a flow of the working liquid between the compression chamber and a compensation chamber; and
a compression stop assembly located in the compression chamber and including an insert defining an inner chamber, and a sleeve displaceable along with the piston assembly and configured to be slidably introduced inside the inner chamber of the insert at an end of a compression stroke of the hydraulic damper to generate an additional damping force;
wherein said sleeve has an external diameter that is smaller than an internal diameter of the main tube, defining a first external flow channel between said sleeve and said main tube;
wherein said insert defines a second external flow channel extending annularly thereabout between said sleeve and said main tube; and
wherein said insert defines a plurality of axially-spaced holes each providing fluid communication between the inner chamber and the base valve assembly via the second external flow channel,
wherein said insert adjoins an inner wall of the main tube and said second external flow channel is defined by a plurality of grooves made in a radially external surface of said insert and in fluid connection with said axially-spaced holes.

2. The hydraulic damper according to claim 1, wherein the piston assembly includes compression and rebound valve assemblies to control the flow of working liquid passing between the rebound chamber and the compression chamber to generate the damping force.

3. The hydraulic damper according to claim 1, wherein said sleeve is attached to the piston assembly by a spring disposed within said sleeve.

4. The hydraulic damper according to claim 3, wherein said spring is a coil spring.

5. The hydraulic damper according to claim 1, wherein said insert has an annular flange adjoining an inner wall of the main tube and separating the compression chamber from said second external flow channel.

6. The hydraulic damper according to claim 1, wherein said sleeve has a hollow interior that defines a radially internal flow channel.

7. The hydraulic damper according to claim 1, wherein said sleeve comprises a plurality of radial projections making a sliding fit with the main tube and separated by bridges.

8. The hydraulic damper according to claim 1, wherein the base valve assembly includes a compression valve assembly and a rebound valve assembly each configured to control the flow of the working liquid between the compression chamber and the compensation chamber.

9. The hydraulic damper according to claim 8, wherein the compression stop assembly further comprises a compression safety valve that opens at a predefined threshold of pressure in the inner chamber of said insert and allows for a flow of working liquid from said inner chamber of said insert to the compression valve assembly of the base valve assembly that bypasses said second external flow channel.

10. The hydraulic damper according to claim 8, wherein the compression stop assembly further comprises a rebound check valve that allows a flow of the working liquid from the rebound valve assembly of the base valve assembly to said inner chamber of said insert, bypassing said second external flow channel during a rebound stroke, and blocking the flow of the working liquid therethrough during the compression stroke.

11. The hydraulic damper according to claim 8, wherein the compression stop assembly further comprises:
a compression safety valve that opens at a predefined threshold of pressure in the inner chamber of said insert and allows for a flow of working liquid from said inner chamber of said insert to the compression valve assembly of the base valve assembly that bypasses said second external flow channel;
a rebound check valve that allows a flow of the working liquid from the rebound valve assembly of the base valve assembly to said inner chamber of said insert, bypassing said second external flow channel during a rebound stroke, and blocking the flow of the working liquid therethrough during the compression stroke; and
a fixing member fixed to the base valve assembly and to said insert and comprising a plurality of angularly disposed dual stroke flow passages joining the base valve assembly with said second external flow channel, wherein at least one of said compression safety valve and said rebound check valve comprises a plurality of deflective discs covering a plurality of angularly disposed flow passages in said fixing member.

12. The hydraulic damper according to claim 1, wherein said insert includes an internal surface defining a plurality of axial projections, and said plurality of axially-spaced holes each include a radially-internal outlet located in a corresponding one of said plurality of axial projections.

13. The hydraulic damper according to claim 1, wherein the main tube includes a widened section to receive the insert.

14. The hydraulic damper according to claim 1, wherein at least one of said insert and said sleeve is made of plastic.

15. The hydraulic damper according to claim 14, wherein said plastic includes polyamide.

16. The hydraulic damper according to claim 1, wherein an insert is made as a single element with a fixing member and provided with at least one of a compression safety valve and a rebound check valve.

17. A hydraulic damper, comprising:
a main tube filed with working liquid and extending between an open end and a closed end;
a piston assembly slidably disposed inside the main tube, attached to a piston rod that extends outside the hydraulic damper through a sealed piston rod guide located at the open end, dividing the main tube into a rebound chamber and a compression chamber and configured to generate a damping force;
a base valve assembly located at the closed end of the compression chamber and configured to control a flow of the working liquid between the compression chamber and a compensation chamber; and a compression stop assembly located in the compression chamber and including an insert defining an inner chamber, and a sleeve displaceable along with the piston assembly and configured to be slidably introduced inside the inner chamber of the insert at an end of a compression stroke of the hydraulic damper to generate an additional damping force;

wherein said sleeve has an external diameter that is smaller than an internal diameter of the main tube, defining a first external flow channel between said sleeve and said main tube;

wherein said insert defines a second external flow channel extending annularly thereabout between said sleeve and said main tube; and wherein said insert defines a plurality of axially-spaced holes each providing fluid communication between the inner chamber and the base valve assembly via the second external flow channel, wherein the base valve assembly includes a compression valve assembly and a rebound valve assembly each configured to control the flow of the working liquid between the compression chamber and the compensation chamber, wherein the compression stop assembly further comprises:

a compression safety valve that opens at a predefined threshold of pressure in the inner chamber of said insert and allows for a flow of working liquid from said inner chamber of said insert to the compression valve assembly of the base valve assembly that bypasses said second external flow channel;

a rebound check valve that allows a flow of the working liquid from the rebound valve assembly of the base valve assembly to said inner chamber of said insert, bypassing said second external flow channel during a rebound stroke, and blocking the flow of the working liquid therethrough during the compression stroke; and a fixing member fixed to the base valve assembly and to said insert and comprising a plurality of angularly disposed dual stroke flow passages joining the base valve assembly with said second external flow channel, wherein at least one of said compression safety valve and said rebound check valve comprises a plurality of deflective discs covering a plurality of angularly disposed flow passages in said fixing member.

18. A hydraulic damper, comprising:

a main tube filed with working liquid and extending between an open end and a closed end;

a piston assembly slidably disposed inside the main tube, attached to a piston rod that extends outside the hydraulic damper through a sealed piston rod guide located at the open end, dividing the main tube into a rebound chamber and a compression chamber and configured to generate a damping force;

a base valve assembly located at the closed end of the compression chamber and configured to control a flow of the working liquid between the compression chamber and a compensation chamber; and a compression stop assembly located in the compression chamber and including an insert defining an inner chamber, and a sleeve displaceable along with the piston assembly and configured to be slidably introduced inside the inner chamber of the insert at an end of a compression stroke of the hydraulic damper to generate an additional damping force;

wherein said sleeve has an external diameter that is smaller than an internal diameter of the main tube, defining a first external flow channel between said sleeve and said main tube;

wherein said insert defines a second external flow channel extending annularly thereabout between said sleeve and said main tube; and wherein said insert defines a plurality of axially-spaced holes each providing fluid communication between the inner chamber and the base valve assembly via the second external flow channel, wherein said insert includes an internal surface defining a plurality of axial projections, and said plurality of axially-spaced holes each include a radially-internal outlet located in a corresponding one of said plurality of axial projections.

* * * * *